United States Patent [19]
Gibson

[11] 4,130,925
[45] Dec. 26, 1978

[54] METHODS OF PIPELINE CONSTRUCTION IN ARCTIC AND SUBARCTIC REGIONS

[76] Inventor: Murray Gibson, 111 Silver Valley Pl., NW., Calgary, Alberta, Canada, T3B 4B5

[21] Appl. No.: 789,744

[22] Filed: Apr. 21, 1977

[51] Int. Cl.² .......................................... B23Q 17/00
[52] U.S. Cl. .................... 29/407; 214/1 PA; 228/103; 228/104; 228/176; 405/217
[58] Field of Search .................. 29/407, 429; 61/103, 61/105, 106; 228/104, 103, 176; 214/1 PA, 1 P

[56] References Cited
U.S. PATENT DOCUMENTS

| | | | |
|---|---|---|---|
| 2,559,703 | 7/1951 | Borgman | 214/1 PA |
| 2,967,628 | 1/1961 | Erdahl et al. | 214/1 PA |
| 3,744,259 | 7/1973 | Wagley | 214/1 PA |
| 3,900,146 | 8/1975 | Fowler | 29/429 X |

*Primary Examiner*—Victor A. DiPalma
*Attorney, Agent, or Firm*—George H. Dunsmuir

[57] ABSTRACT

Methods of pipeline construction in arctic and subarctic regions and apparatus for carrying out those methods are disclosed. Following the disclosed methods, summer-constructed fabrication yards are established at locations along the pipeline right-of-way spaced at intervals of 100 to 150 miles. Each summer-constructed fabrication yard is regarded as being at or close to the center of its associated pipeline division, which is approximately 100 to 150 miles in length. Each fabrication yard comprises a group of summer-constructed buildings adapted for carrying out the steps in fabricating a pipe section, including quality control, X-ray, hydrostatic testing, external coating, final inspection, and river coating and weighting, along with yard facilities for moving elongated (e.g., 2500 foot) pipe sections from place to place during their fabrication, inspection, coating, etc.

In the winter following the summer in which each pipe section is fabricated it is towed to its place of installation over a working snow pad or snow road following the pipeline right-of-way, for instance, by a pair of large tow tractors operating in tandem and provided with servo-controls by which one tow tractor operator in the front tractor can operate both tractors. The sensors or sensing instruments mounted on or in the pipe section in the fabrication yard during summer are cabled to indicating instruments in the oversized cab of the lead tow tractor, where they can be constantly observed by the controller or crew chief to assure that while in transit the pipe section undergoes no bend less than its permissible roped radius of curvature. The forward end of the pipe section being towed into place is mounted on a nose sled which also bears a compressor and air heater for the purpose of maintaining an elevated temperature inside the hermetically sealed pipe section.

When a pipe section is being moved from the summer fabrication yard to its winter place of installation over a snow road a number of sideboom tractors (e.g., ten) accompany the pipe section, guiding respective portions of it in special roller cradles which are equipped with pipe-gripping means or brakes remotely controlled by the respective sideboom operators, so that the sideboom tractors can instantly grasp their associated pipe sections to assist in towing or prevent uphill or downhill "runaway".

22 Claims, 11 Drawing Figures

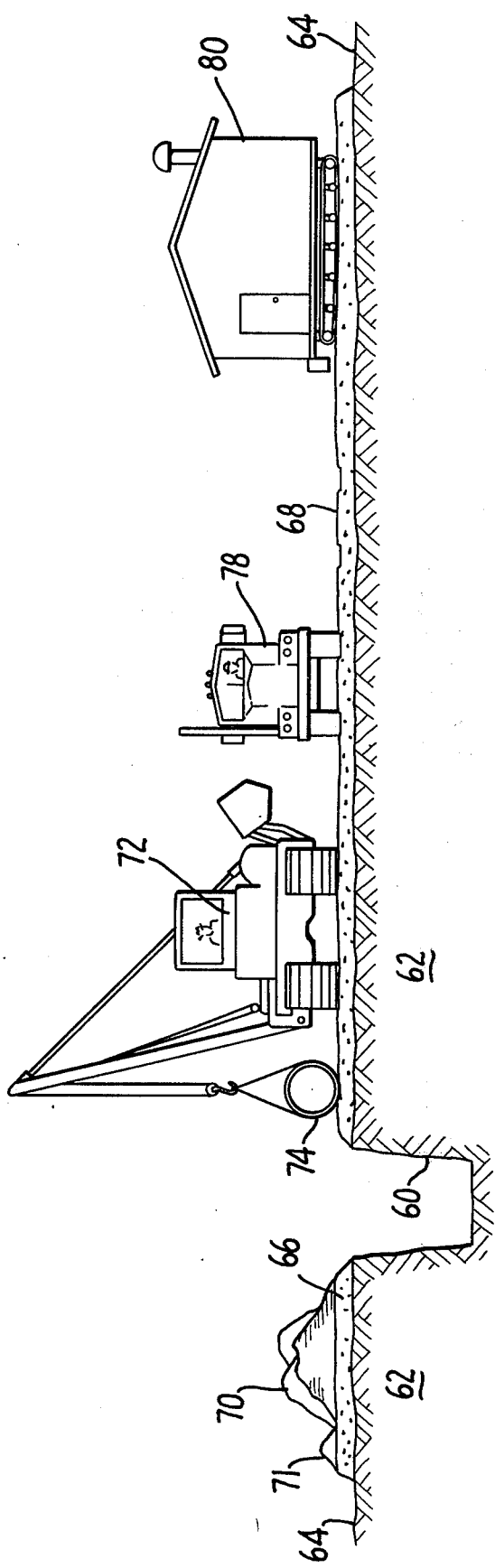
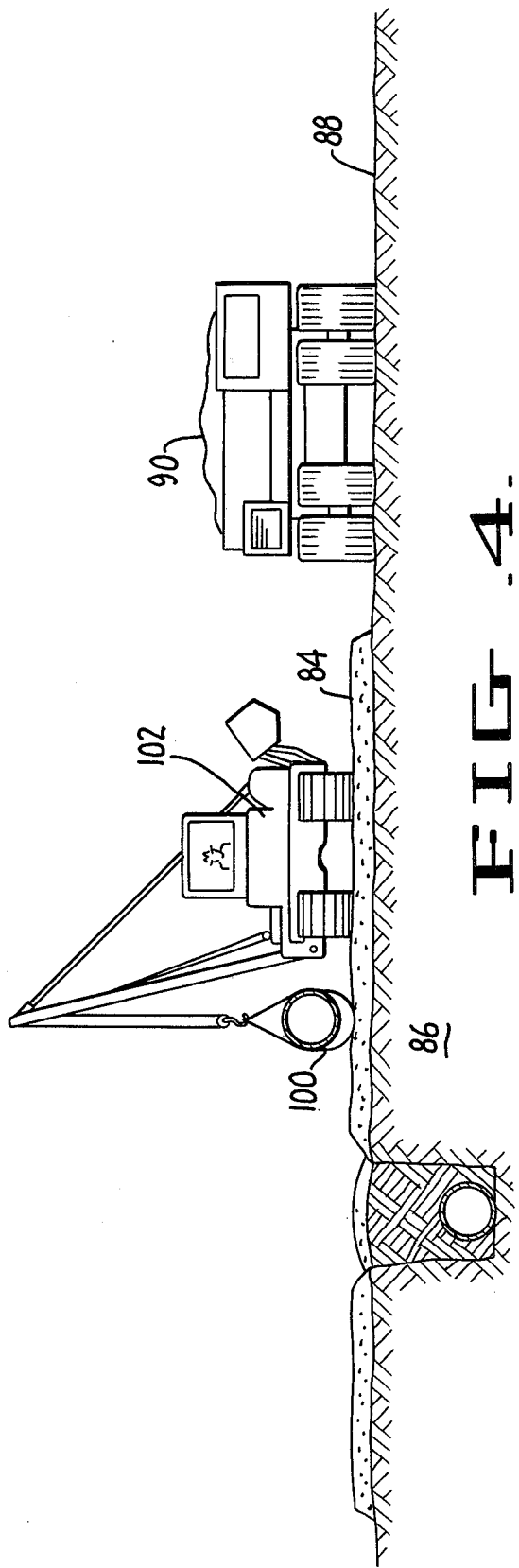

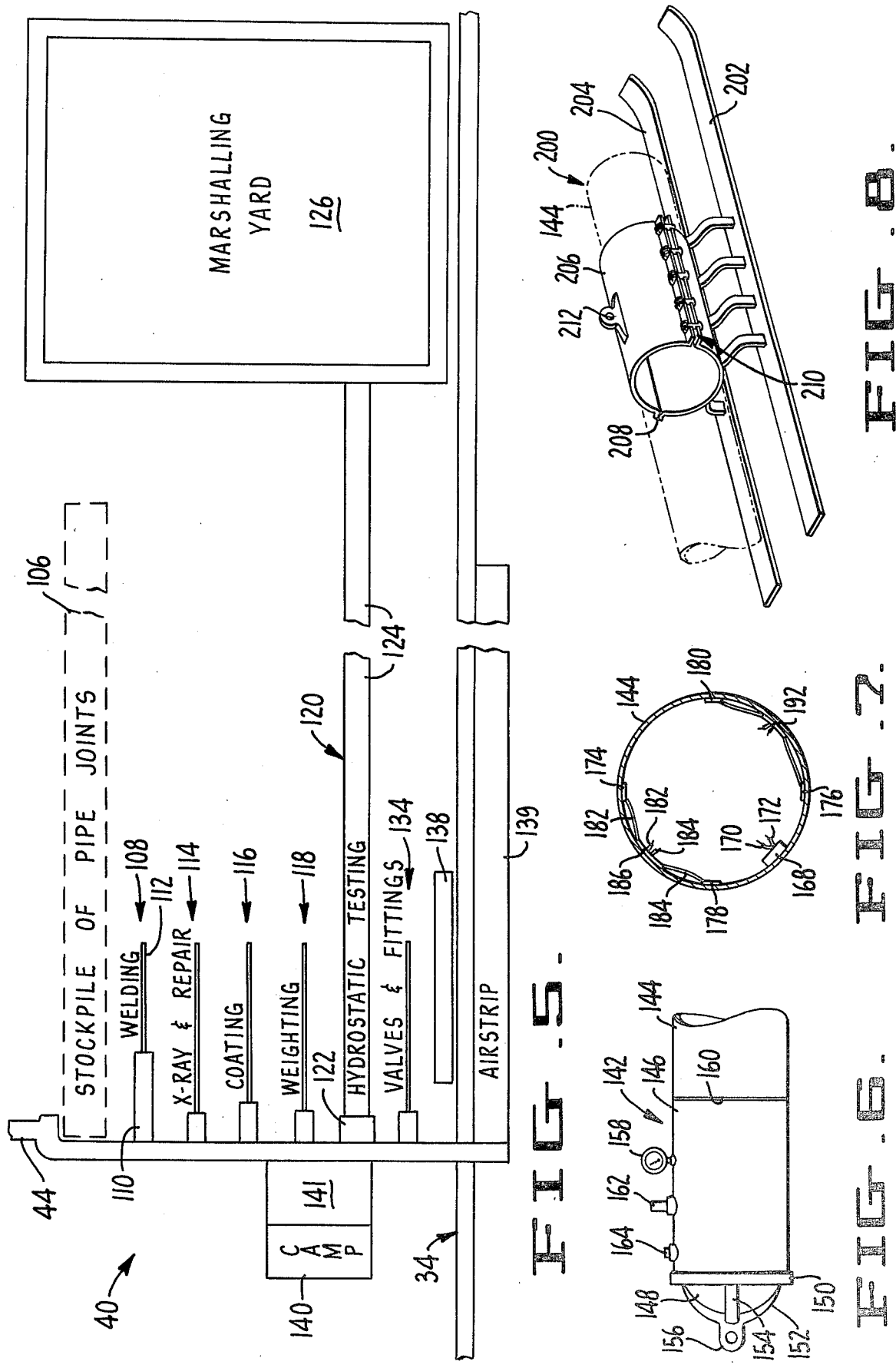

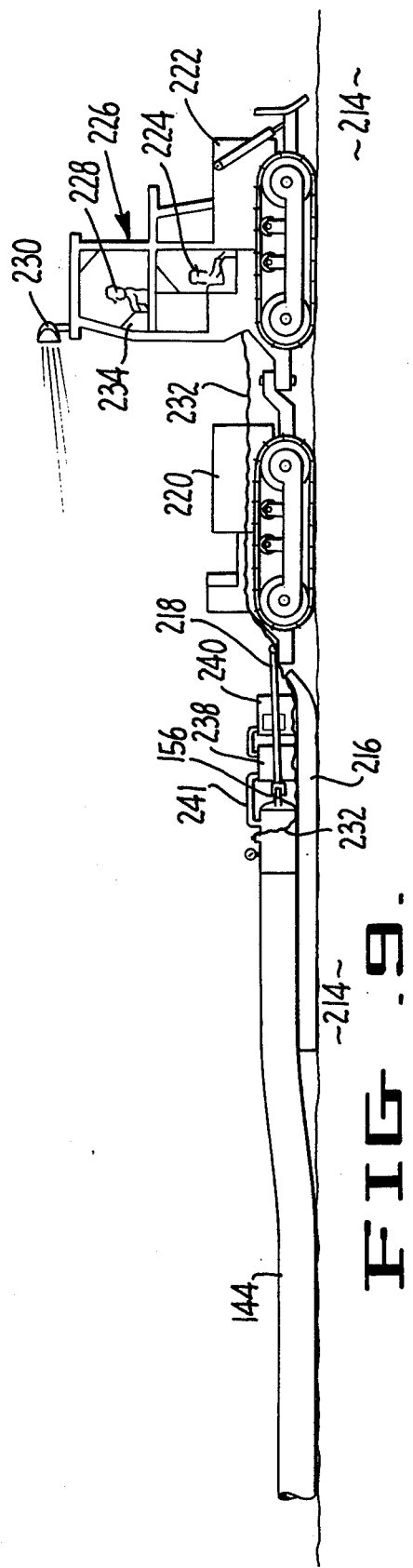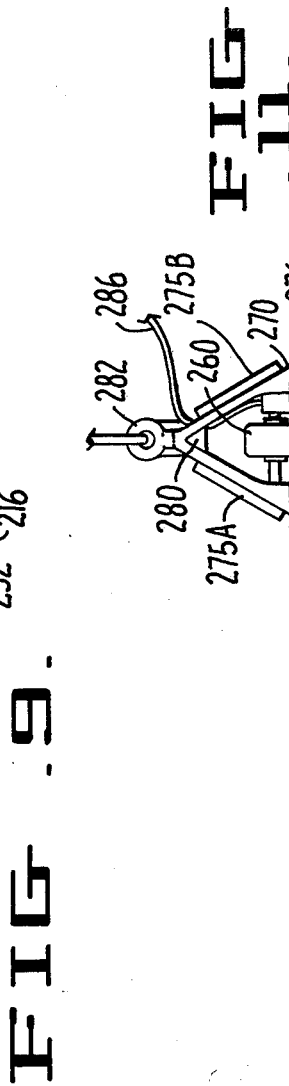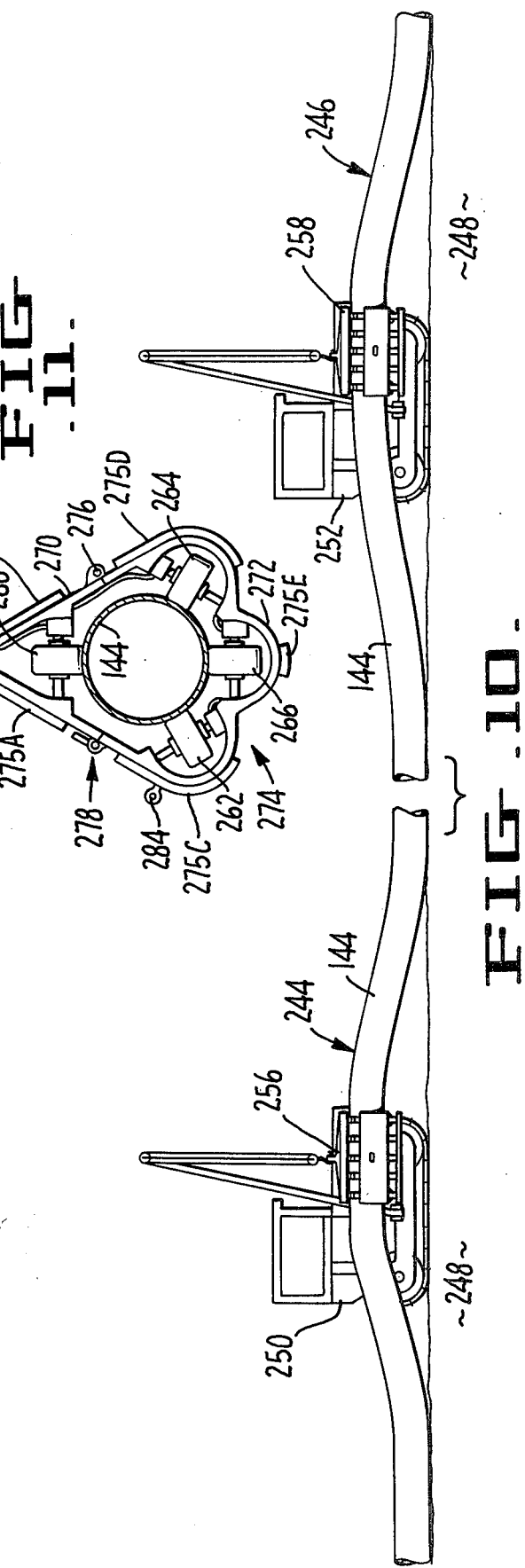

METHODS OF PIPELINE CONSTRUCTION IN ARCTIC AND SUBARCTIC REGIONS

BACKGROUND OF THE INVENTION

1. Field of the Invention

The present invention relates to methods of pipeline construction in arctic and subarctic regions and apparatus for carrying out those methods, and more particularly to methods of pipeline construction in arctic and subarctic regions in the employment of which pipeline sections many joints in length are fabricated by welding and tested with water as the testing medium during summer weather and then installed in the pipeline by making comparatively few joints under winter field conditions, with little or no ecological damage and at great savings in money, labor, equipment, and materials, with much earlier and more realistic completion dates and with much better labor relations both in the short run and the long run both with native employees and temporary immigrant employees, and apparatus for carrying out those methods.

2. Description of the Prior Art

The prior art methods of pipeline construction in arctic and subarctic regions as exemplified in the construction of the northern portion of the Trans-Alaska Pipeline, being as they are largely adaptations of techniques employed in the construction of pipelines at lower latitudes, involve extremely serious if not substantially insuperable difficulties which arise from the nature of the arctic and subarctic regions themselves and from the many requirements necessarily imposed by governmental authorities in order to protect the tundra and permafrost from damage which is presently believed to be irreversible, and the long-run effects of which upon not only the native arctic and subarctic fauna and flora but the climate and perhaps the fauna and flora of the entire Northern Hemisphere, or the entire world, is very largely unpredictable, but is viewed with great gravity by those having the best information on the subject.

As is well-known to those having broad knowledge of the arctic and subarctic regions, the areas of tundra and permafrost over which the aforementioned difficulties obtain extend throughout virtually the entire coastal area of the Arctic Ocean, including not only the Alaskan North Slope region and the Far North region of Canada, but also the extensive arctic coastal regions of the USSR, and also extend many hundreds of miles to the south of those arctic coastal regions. For instance, the southern fringe of discontinuous permafrost extends below 62° North Latitude near the Great Slave Lake. Further, the southern fringe of continuous permafrost lies well below the MacKenzie Delta, and thus, e.g., the 200-mile Alaska-Canada coastal section of the proposed Canadian Arctic Gas Pipeline lies entirely in the continuous permafrost zone. The proposed Polar Gas Pipeline extends to Melville Island, at a point above 75° North Latitude, and thus almost 50% of this proposed pipeline lies in regions of continuous or discontinuous permafrost.

Due to governmental regulations necessitated by these characteristics of the arctic and subarctic ecostructure, which often are and will more often in the future be stringently enforced by government inspectors and others concerned with the protection of the arctic and subarctic ecostructure, many extremely if not prohibitively expensive measures must be taken if pipeline construction in summer in these regions is to be permitted at all. The most costly of these measures is the provision of a "work pad" of insulating gravel which is often required to be a least 4 feet deep and must be laid to considerable width, e.g., 100 feet or more, all along the pipeline right-of-way and wherever else construction activities and the movement of heavy equipment is to take place. In many regions of the arctic and subarctic sufficient quantities of native gravel for the construction of the many necessary miles of "work pads" is simply not available, and even where such quantities of gravel appear to be potentially available, as along the coastlines, a serious question arises as to the ecological damage which might be occasioned by the removal of this naturally-occurring gravel, such that a substantial possibility exists that subsequent governmental regulation will forbid its removal from its site of natural occurrence. Thus, considerable percentages of the necessary gravel for such "work pads" would necessarily have to be supplied by crushing rock excavated at locations lying at considerable distances, e.g., 20 miles, from the sites of the required "work pads", thus necessitating the construction of further "work pads" over which to transport the crushed gravel, as well as whatever is available of naturally-occurring gravel "borrow" to the nearest points of the "work pads".

When it is considered that one mile of such a gravel "work pad", including the cost of gravel and the cost of gravel-laying labor, may be as much as $1,800,000.00, and it is kept in mind that the present estimated prices of gasoline refined from petroleum transported through the Trans-Alaska Pipeline are already raising considerably unfavorable public reaction, it is not difficult to understand that in the future the summer construction of pipelines in arctic and subarctic regions employing the now conventional methods used in constructing the northern portion of the Trans-Alaska Pipeline may be regarded as totally economically infeasible.

A worse problem yet is that in summer pipeline ditches (in permafrost) can be kept open for only very limited times. When this problem is compounded by pipe failures and the like the entire schedule of a complete pipeline may fall one or two years into arrears.

In addition to the substantially insuperable problems and costs raised by ecology-preserving governmental regulations in arctic and subarctic areas, there are also vast areas of the arctic and subarctic in which the nature of the terrain itself serves as a virtually insuperable barrier to summer pipeline construction. These areas are laced with rivers, lakes and other water barriers which prevent the passage of heavy equipment, and thus prevent the transport of pipe joints, sideboom tractors, tow tractors, welding equipment, pipe-bending equipment, pipe-wrapping equipment, etc., and the many other types of equipment and supplies which are indispensible to the construction of pipelines according to conventional methods, even where sufficient gravel is available for the construction of "work pads" of sufficient size over the intermediate areas of "dry land".

For the above reasons, and many others not discussed in detail, pipeline construction in arctic and subarctic regions is forced into the winter period throughout those areas of permafrost and tundra over which or through which pipelines must be constructed if the vast fossil fuel resources of the arctic and subarctic regions are to be brought to the lower latitudes for consumption.

One of the expedients which makes arctic and subarctic winter pipeline construction possible is the use of work pads made from compacted snow, rather than gravel. These elongated snow pads, sometimes called "snow roads", rather than "work pads", are not necessarily fabricated from naturally-occurring snow but rather may be fabricated and have been fabricated in the prior art from "artificial snow" made by portable or self-propelled snow-making machines from water trucked in in heated tanker trucks. Such snow-making machines, which are well-known in the prior art and are commercially available, can produce sufficient artificial snow in one day to form a compacted snow pad 2 feet deep by 30 feet wide and 1 mile long.

Since such a snow pad may, in accordance with the conventional method, have to be 100 feet wide or more to give maximum productivity or construction, it may be necessary to employ several of such snow-making machines in order to advance the necessary snow pad with sufficient rapidity to accommodate the requirements of arctic and subarctic winter pipeline construction, particularly since "winter", for working purposes, is defined by governmental authorities as extending from the first day to the last day on which a particular degree of frost penetration has occurred. Work may be interrupted by early thaw at the end of the season, after which work, even as carried on by low ground-pressure vehicles, must be suspended.

This requirement for multiple snow-making machines, each of which may typically cost $1,000,000.00, along with the great expense of trucking in constantly heated water when the ambient temperature may be as low as 40 below zero Fahrenheit ($-40°$ F.), results in the cost of a typical snow pad 120 feet wide and 2 feet thick being as much as $290,000.00 per mile. Further, these snow pads may have in one winter of construction following now conventional methods a linear extent of, e.g., 630 miles along the pipeline right-of-way alone, not to mention the additional miles of somewhat narrower snow pad which must be constructed in order to haul supplies to the right-of-way, etc.

The cost of providing a 120-foot wide snow pad 600 or more miles long each winter is one of the largest but by no means the only economic problem involved in the construction of pipelines in arctic and subarctic winters.

Another such economic problem springs from the virtually absolute requirement that all construction equipment be operated 24 hours of every working day. When such a piece of equipment has stood unoperated for only a short length of time in the out-of-doors in the arctic and subarctic winters and its temperature has dropped to the normal ambient of somewhere between $-25°$ and $-40°$ F. it cannot be restarted, except after complete thawing by the application of heat from heat sources requiring quantities of, e.g., propane which are economically unavailable at winter arctic and subarctic pipeline construction sites.

As learned in the construction of the Trans-Alaska Pipeline, heavy equipment operated for several months on a constant 24 hour per day basis must be brought out at the end of that period and completely rebuilt, including the complete teardown of the equipment and the replacement of virtually all bearings and mutually moving contacting surfaces, such as piston rings. Typically, a sideboom tractor may cost as much as $250,000.00, and may have to be rebuilt at a cost equal to 30% or more of its original price after a winter of continuous, 24 hour per working day operation, if indeed it lasts through the working winter. Even with a costly summer overhaul the value of a $250,000.00 sideboom tractor after two arctic or subarctic winters can be as low as scrap value. Additionally, the provision of human resources by way of labor for arctic and subarctic winter pipeline construction in accordance with the now conventional methods employed in the construction of the northern reaches of the Trans-Alaska Pipeline presents another almost insurmountable problem, especially since the arctic and subarctic winters as defined by governmental authorities, which as explained above is the only work period practically available, may be as short as 100 days per year, or even 85 days per year. In addition, the wind chill factor may shut down work even when the temperature is not severely low.

This extremely short work season may require the hiring of as many as 15,000 men and women to work in the out-of-doors in the extremely harsh arctic and subarctic winters and to be confined to the work area between work shifts for many weeks at a time.

Even putting aside the unprecedented labor cost in this situation and the greatly reduced efficiency of the individual worker working under such extremely adverse conditions (estimated by some to be as much as 30% below summer work level efficiency) and the concomitant labor relations problems of a new and unprecedented order due to the adverse psychological effects of virtual confinement of the workers at the work site during off-work hours and in "survival shacks" during work hours, experts in the arctic and subarctic pipeline construction art are becoming more and more aware of the possibility that sufficient labor willing to work in the outdoors under arctic and subarctic winter conditions over the required timespans may simply not be available at all. This is particularly true when the type of labor in question is, for instance, the highly expert arc welders necessary to fabricate high-quality, leakproof welds in the field under such conditions.

Over and beyond these problems raised by the necessity to provide great numbers of workers in the field in arctic and subarctic winters is the recognized fact that such workers not only are inefficient under such conditions, as just explained, but also tend to frequently produce a defective work product, simply due to the psychological pressures of the harsh environment, and not to labor "slowdown" tactics or intentional sabotage.

It is recognized by experts in this art that, cumulatively, these problems of pipeline construction under arctic and subarctic winter conditions can result in the need for an extra year or more of construction time, which requirement can be or become a nationally important concern due to the size of the cost overrun which may amount to billions of dollars.

It has also been projected that the abovementioned labor problems may in the near future be seriously exacerbated by governmental regulation inspired by concern for native employees, and the concomitant demand that those native employees be given substantially regular employment rather than seasonal employment amounting to 100 days or less per year.

Further, the problems of arctic and subarctic winter construction detailed immediately hereinabove apply not only to the construction of the pipeline itself but also apply to the construction of auxiliary facilities and structures, sometimes called "civils", such as compressor or pump stations, foundations, access roads from river wharves, airstrips for heavy aircraft (Hercules), airstrips for lighter service aircraft, campsites, stockpiles, wharves, warehouses, etc.

Many further problems are, of course, raised by conventional arctic and subarctic winter pipeline construction methods, and arctic and subarctic winter conditions. For example, the inspecting of weld joints hydrostatically at, say, 1400 psi under conditions wherein water simply cannot be used for such testing require the provision, storing, pressurization, etc., of large volumes of methanol, or other "anti-freeze" fluids. This problem is, of course, very greatly exacerbated by the present, or in some countries very near future, requirement that no such "foreign" materials be discharged into the arctic or subarctic environment either advertently or inadvertently. The equipment and methods mandated for the prevention of spillage of such "foreign" material will be seen to grossly exacerbate the abovementioned economic problems of arctic and subarctic winter pipeline construction.

Added to all of the above problems of arctic and subarctic winter pipeline construction, and perhaps surmounting them all in difficulty, if not impossibility, of solution is what might be called the "credibility problem". By this is meant the fact that the cumulative effect of unpredictable variations in the length of the "official" arctic and subarctic winters, unpredictable variations in labor costs, unpredictable variations in the cost of equipment and supplies due to continuing worldwide inflation, and unpredictable new costs resulting from the constant proliferation of ever more stringent government regulations designed to protect the arctic and subarctic ecosystem make the reliability of pipeline cost projections highly suspect, or hedged with such prestated broad limits of variation as to be virtually meaningless. This credibility problem, known to have already resulted in billions of dollars of cost overruns in earlier arctic and subarctic winter pipeline construction efforts, has resulted in the refusal of governments to grant permits for such construction, which refusals are now delaying the construction of many hundreds of miles of key arctic and subarctic pipeline, as well as the virtual unavailability or extreme high cost of venture capital for the construction of pipelines in these regions. Further, it is almost uniformly projected by those knowledgeable in the problems of pipeline construction in these regions that this credibility problem will be greatly exacerbated in the near future by additional problems of inflation, governmental regulation, etc.

While it is true that many measures and expedients have been suggested and adopted for ameliorating in some slight degree the cost and credibility problems of arctic and subarctic pipeline construction no broad and all-embracing "quantum leaps" in arctic and subarctic pipeline construction methods and apparatus have to the present data resulted in any substantial reduction in the above-detailed cost problems or in the elimination of the above-defined credibility problem.

Among these stop-gap methods and expedients are the welding together of two or three pipe joints before laying in order to save welding at the place of installation. These two and three-joint pipe sections are strung along the pipeline right-of-way behind the snow-making machines which lay the required snow pad, interspersed with a certain percentage of single joints which must be bent on site by bending machines under arctic and subarctic winter conditions. While such "double-jointing" and "triple-jointing" results in some savings in welding costs and employment problems, etc., this sub-method does not either sufficiently reduce the huge cost of arctic and subarctic winter pipeline construction to result in lowering the cost of the necessary venture capital or contribute substantially to the solution of the credibility problem.

As is well-known, each weld joint produced in the field, involving a great deal of very costly pre-heating by propane burners or the like to avoid weld cracking and other quality problems, also involves a very substantial possibility of weld defects even in the hands of the most expert pipeline welders, and extensive repairs of these defects can ruin an arctic or subarctic pipeline construction schedule if the making of all such repairs is strictly enforced. This situation, along with the great psychological problems of working in arctic and subarctic winters at all, has at times in the past led to the attempted concealment of such defects and the avoidance of such costly repairs. Such concealment, cumulated over an entire winter period, and perhaps even lying over into a second winter period, when subsequently discovered, can result in cost overruns of many tens of millions of dollars for correction. This kind of statistical and projectional unreliability results in extremely high cost rates for working capital, if indeed such working capital is available at all for future arctic and subarctic winter pipeline construction projects.

SUMMARY OF THE INVENTION

Accordingly, it is an object of the present invention to provide methods of pipeline construction in arctic and subarctic regions and apparatus for use in carrying out the same whereby the costs of pipeline construction in these regions may be very substantially reduced and the projections of such costs rendered reasonably credible.

Another object of the present invention is to provide methods of pipeline construction in arctic and subarctic regions and apparatus for carrying out the same whereby the potential for damage to the ecosystem inherent in such construction is very substantially reduced.

Yet another object of the present invention is to provide methods of pipeline construction in arctic and subarctic regions and apparatus for carrying out the same whereby pipeline construction working conditions are substantially ameliorated and thus the turnover of pipeline construction personnel is substantially reduced and the quality of available specialists in pipeline welding and other skills is substantially increased, and further the average productivity of the entire labor force is substantially increased.

Yet another object of the present invention is to reduce costly and wasteful travel time.

A yet further object of the present invention is to provide methods of pipeline construction in arctic and subarctic regions and apparatus for carrying out the same whereby the danger of death or serious injury to pipeline workers is substantially reduced.

An additional object of the present invention is to provide methods of pipeline construction in arctic and subarctic regions and apparatus for carrying out the same whereby the extremely high cost of heavy equipment maintenance and repair occasioned by the severe cold of winter in these regions and the requirement for 24-hour operation imposed thereby is substantially reduced.

A further object of the present invention is to provide methods of pipeline construction in arctic and subarctic regions and apparatus for carrying out the same whereby the cost of transporting personnel and equipment by air, often by helicopter, to pipeline sites is substantially reduced.

A yet further object of the present invention is to provide methods of pipeline construction in arctic and subarctic regions and apparatus for carrying out the same which are equally applicable to in-ground and above-ground pipeline construction.

Another object of the present invention is to provide methods and apparatus for arctic and subarctic pipeline construction whereby a large percentage of the girth welds can be made in summer using automatic welding machines, which have been shown to produce 130 welds per day, as compared with 75 welds per day by manual methods.

Other objects of the present invention will in part be obvious and will in part appear hereinafter.

The present invention, accordingly, comprises the several steps and the relation of one or more of such steps with respect to each of the others, and the apparatus embodying features of construction, combinations of elements, and arrangements of parts which are adapted to effect such steps, all as exemplified in the following detailed disclosure, and the scope of the present invention will be indicated in the appended claims.

In accordance with a principal feature of the present invention a plurality of non-winterized fabrication yards are established at intervals of about 50 to 100 miles along a portion of a pipeline right-of-way located in an arctic or subarctic region or regions, and multi-joint pipe sections comprising in some cases as many as 75 joints of pipe are fabricated at said fabrication yards during summer and stored there for installation in said pipeline during winter at distances of up to 75 miles or more therefrom.

In accordance with another principal feature of the present invention these fabrication yards are located at compressor or pump station sites, thereby avoiding duplication of access roads, airstrips, and other civil facilities.

In accordance with another principal feature of the present invention said multi-joint pipe sections are hydrostatically tested at said fabrication yards during summer, using water as the pressure testing medium, rather than methanol or other ecological poisons.

In accordance with another principal feature of the present invention said multi-joint pipe sections are cleaned, externally coated, and in some cases concreted at said fabrication yards during summer.

In accordance with a further principal feature of the present invention said multi-joint pipe sections are fitted with instruments at said fabrication yards whereby certain of their physical characteristics, such as the degree of bending at certain points therealong, may be monitored while said multi-joint pipe sections are being transported to their places of installation along said pipeline during winter.

In accordance with a yet further principal feature of the present invention said multi-joint pipe sections are towed from said fabrication yards to their places of installation during winter along snow roads following the pipeline right-of-way.

In accordance with another principal feature of the present invention several portions of at least one of said multi-joint pipe sections are raised from the surface of said snow road by sideboom tractors or the like while being towed along said snow road from said fabrication yard to the point of installation, whereby the torquin of said pipe section, with its possibly attendant cracking of spiral or longitudinal weld seams or girth welds, is contained within permissible stress limits or eliminated entirely.

In accordance with yet another principal feature of the present invention a plurality of separate portions of a multi-joint pipe section being towed to its place of installation are supported on sled-like devices or toboggan-like devices.

In accordance with a still further principal feature of the present invention substantial quantities of snow are extracted from said snow road at points between said fabrication yard and the section of said snow road along which pipe installation activity is being carried on and is transported to the end of said snow road remote from said fabrication yard and there reincorporated into said snow road.

In accordance with an additional principal feature of the present invention such extractd snow is transported to the remote end of said snow road during winter by means of low ground-pressure vehicles which are permitted to operate off said snow pad.

In accordance with another aspect of the present invention joints of pipe are welded together to provide a unitary pipe section and said pipe section is moved a substantial part of the distance from its place of fabrication to its place of installation over an elongated snow pad with at least part of said pipe section bearing upon said elongated snow pad.

In accordance with yet another aspect of the present invention said unitary pipe section is moved a substantial part of the distance from its place of fabrication to its place of installation with plural parts thereof supported by sideboom tractors and intermediate parts thereof bearing upon said elongated snow pad, whereby to damp out the destructive elastic vibrations which are known to occur when it is attempted to move a pipe section by sideboom tractors without the road-contact damping of the present invention.

In accordance with yet another aspect of the present invention said unitary pipe section is hydrostatically tested at its place of fabrication using water as the testing medium.

In accordance with yet another aspect of the present invention said unitary pipe section is substantially completely prepared for installation at its place of fabrication.

In accordance with yet another aspect of the present invention caps are hermetically sealed to the ends of said unitary pipe section and a gaseous medium is injected into said unitary pipe section, thereby raising the pressure within said unitary pipe section to a superambient level, which may be greater than 50 pounds per square inch, and that pressure is maintained within said unitary pipe section for at least part of the time during which it is being transported from its place of fabrication to its place of installation in said pipeline.

In accordance with yet another feature of the present invention said unitary pipe section is equipped with sensing means for sensing one or more of its physical characteristics, and these physical characteristics are monitored while said unitary pipe section is being transported from its place of fabrication to its place of installation.

In accordance with yet another aspect of the present invention said monitoring is carried out by means of indicating devices mounted on a tractor which provides at least part of the tractive effort for moving said unitary pipe section along said elongated snow pad.

In accordance with another aspect of the present invention the momentary indications of at least one of said indicating devices are recorded by recording means carried by said tractor.

In accordance with another aspect of the present invention heating means are provided for heating the gaseous medium within said unitary pipe section during the moving of said unitary pipe section over said elongated snow pad from its place of fabrication to its place of installation in said pipeline.

In accordance with another aspect of the present invention a method of pipeline construction in arctic and subarctic regions comprises the steps of welding joints of pipe together to provide unitary pipe sections when the ambient temperature is high enough to permit outdoor hydrostatic testing of said pipe sections using only water as the testing medium, providing an elongated snow pad along part of the pipeline right-of-way, placing each of said pipe sections on said snow pad, and moving each of said pipe sections toward its place of incorporation into the pipeline by towing it along said elongated snow pad, with parts thereof supported by side booms and other parts in contact with said snow pad to prevent elastic vibrations which otherwise would cumulate and destroy the pipe section at speeds in excess of about one mile per half day.

In accordance with another aspect of the present invention a method of pipeline construction in arctic regions comprises excavating snow from a portion of said elongated snow pad adjacent which pipe sections have been installed, transporting said excavated snow to the end of said elongated snow pad remote from said place of fabrication, and incorporating said excavated snow into an extension of said elongated snow pad.

In accordance with another aspect of the present invention a method of pipeline construction in arctic and subarctic regions comprises welding joints of pipe together to provide a unitary pipe section and moving said pipe section a substantial part of the distance from its place of fabrication to its place of installation over an elongated snow pad with at least part thereof being borne by sled means having runners bearing upon said elongated snow pad or by weight-distributing means having a large area resting upon said elongated snow pad.

In accordance with another aspect of the present invention an article of manufacture useful in pipeline construction in arctic and subarctic regions comprises an elongated pipe section fabricated from a plurality of joints of pipe joined in end-to-end relation by welded joints and having closure means joined to its opposite ends.

In accordance with another aspect of the present invention said elongated pipe section including a plurality of joints of pipe joined in end-to-end relation by welded joints contains a gaseous medium at super-ambient pressure.

In accordance with another aspect of the present invention said article of manufacture comprises at least one sensing means mounted thereon for sensing the momentary values of at least one of its physical properties.

In accordance with another aspect of the present invention said article of manufacture comprises coupling means for coupling fluid conduit means thereto for fluid communication with the interior thereof.

In accordance with another aspect of the present invention said article of manufacture is provided with fluid conduit coupling means at both ends thereof whereby a fluid may be passed therethrough from end to end.

In accordance with another aspect of the present invention apparatus for use in pipeline construction in arctic and subarctic regions comprises a self-propelled low ground-pressure vehicle of the type permitted to carry heavy loads over unprotected tundra having snow-excavating means mounted thereon.

In accordance with another aspect of the present invention said low ground-pressure vehicle is also provided with receptacle means for receiving snow excavated by said snow-excavating means and retaining it while said low ground-pressure vehicle moves from the place at which the snow contained therein was excavated to a place at which the snow contained therein is to be deposited.

In accordance with yet another aspect of the present invention apparatus for use in pipeline construction in arctic and subarctic regions comprises a tow tractor for towing a multi-joint pipe section over an elongated snow pad, transducing means mounted on said tow tractor for receiving signals from sensing means mounted on a pipe section being towed by said two tractor and actuating indicating means to indicate the momentary values of at least one physical property of the pipe section being towed, and indicating means mounted on said tow tractor and actuated by said transducing means for indicating said momentary values.

In accordance with another aspect of the present invention said at least one physical property is the degree of bending of one particular portion of said pipe section.

In accordance with another aspect of the present invention, said at least one physical property is the temperature of the inner surface of a particular part of said pipe section.

For a fuller understanding of the nature and objects of the present invention, reference should be had to the following detailed description, taken in connection with the accompanying drawings.

BRIEF DESCRIPTION OF THE DRAWINGS

FIG. 3 is a sectional view in elevation of the right-of-way of an arctic pipelne being constructed in winter;

FIG. 4 is a sectional view in elevation of the transport snow pad used in carrying out the present invention;

FIG. 5 is a plan view of a summer fabrication yard of the present invention;

FIG. 6 is an elevational view of a pipe section closure according to the present invention, welded to one end of a multi-joint pipe section;

FIG. 7 is a transverse view in section of a multi-joint pipe section fitted with strain gauges and a temperature sensor in accordance with the teachings of the present invention;

FIG. 8 is an elevational view of a lifting eye pipe sled of the present invention;

FIG. 9 is an elevational view of the forward end of a multi-joint pipe section being transported from a summer fabrication yard to its place of installation, showing the tandem tow tractors and the nose sled fitted with compressor, air heater, and instrumentation, all in accordance with the present invention;

FIG. 10 is an elevational view of two central portions of a multi-joint pipe section being moved from the summer fabrication yard to its place of installation by the method of the present invention; and FIG. 11 is an elevational view of a roller cradle of the present invention equipped with a remote control pipe grip or brake in accordance with the present invention.

DESCRIPTION OF THE PREFERRED EMBODIMENTS

Figure 1:
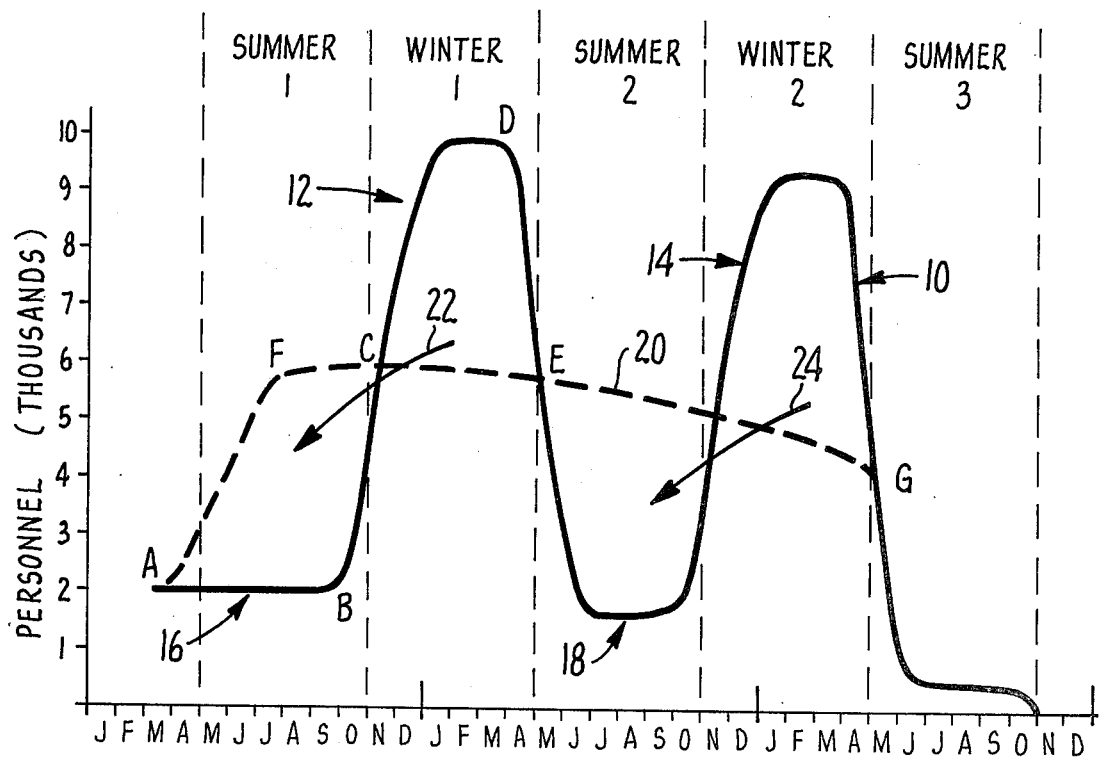
FIG. 1 is an idealized graphic representation of the personnel-requirement leveling achieved by the present invention as compared with prior art pipeline construction methods.

Referring now to FIG. 1, there is shown an idealized graphic representation of the personnel requirement leveling achievement by the present invention, as compared with prior art arctic and subarctic pipeline construction methods.

Considering first the prior art personnel requirements curve 10 (solid line), it will be seen that this prior art personnel requirements curve is characterized by lobes or peaks 12, 14, one lobe or peak occurring in each winter construction period.

As will further be seen from FIG. 1, the amplitude of each of these personnel requirements lobes 12, 14 is approximately four times as great as the personnel requirement level 16, 18 of the previous summer work period. Expressing this ratio alternatively, it can be seen from the personnel requirements curve 10 of FIG. 1 that prior art arctic and subarctic pipeline construction methods required FOUR TIMES AS MANY WORKERS IN WINTER AS IN SUMMER.

Going to the scale of required personnel in thousands as graduated upon the axis or ordinates in FIG. 1, which scale is taken from published projections for an actual arctic pipeline, it will be seen that the winter personnel requirements characteristic of prior art arctic and subarctic pipeline construction methods are even more forbidding in absolute numbers than the aforedescribed ratios imply.

That is to say, the required increase in personnel from each summer construction period to its succeeding winter construction period is about EIGHT THOUSAND WORKERS. The opinion has recently been expressed by experts in the arctic and subarctic pipeline construction art that EIGHT THOUSAND pipeline construction workers, including large numbers of highly skilled welders, equipment operators, etc., to work for only one hundred days, more or less, during the severest part of the extremely harsh arctic and subarctic winter, are simply not available. Further, even if one were to consider hiring the bulk of these workers from among the indigenous or native population of these arctic and subarctic regions, and further favorably assuming that sufficient indigenous personnel, sufficiently trainable, were available, it is widely believed among those skilled in arctic and subarctic pipeline construction that civic groups interested in the welfare of the indigenous populations of these regions will soon prevail upon governmental authorities to prohibit the casual hiring and firing of such indigenous personnel.

The present invention avoids these and other extremely difficult if not totally insurmountable problems raised by the great amplitude of the winter employment lobes 12, 14 of the prior art personnel requirements curve 10 by substituting for the prior art personnel requirements curve 10 a smooth, lobe-free personnel requirements curve 20 (dashed line) having a smooth, non-singular, essentially flat top FCEG. This is accomplished, in accordance with the methods of the present invention, by transferring most of the work represented by the area CDEC under personnel requirements curve 10 to the previous summer, as represented by the area ABCFA between curve 10 and curve 20, the bulk of which lies in the first summer of construction, as shown by arrow 22.

As will be seen by comparing the second summer and second winter portions of curves 10 and 20 of FIG. 1, the method of the present invention achieves a similar transfer of manhours from the second winter to the second summer as indicated by arrow 24.

Thus, by employing the teachings of the present invention a highly desirable personnel requirements curve such as exemplified by the idealized (dashed) curve 20 of FIG. 1 is achieved.

Further, by employing the teachings of the present invention and thus approximating to the idealized personnel requirements curve 20 of FIG. 1 it is possible to offer skilled pipeline workers continuous work, summer and winter on one projected pipeline, and to offer continuous, year-round work to indigenous personnel, thereby overcoming several of the extremely difficult personnel problems involved in the use of prior art arctic and subarctic pipeline construction methods.

Further, by employing the teachings of the present invention the possibility of losing an entire year of production, and thus incurring interest charges of up to $1,000,000,000.00, is substantially reduced.

Further, as will be obvious from consideration of FIG. 1, similar large amounts of equipment-hours will be transferred from winter to the previous summer by employing the methods of the present invention, and thus a large part of the great economic loss occasioned by twenty-four hour per day, day-in-day-out operation of expensive equipment throughout the arctic and subarctic winter will be eliminated by employing the teachings of the present invention.

Further, since it is well-known that work performed during the arctic and subarctic summer is far more accurately performed, due to the vastly better psychological and physiological working climate, it will be understood that by employing the teachings of the present invention it can be expected that a vastly superior pipeline, far freer of defective welds, etc., can be achieved.

Figure 2:
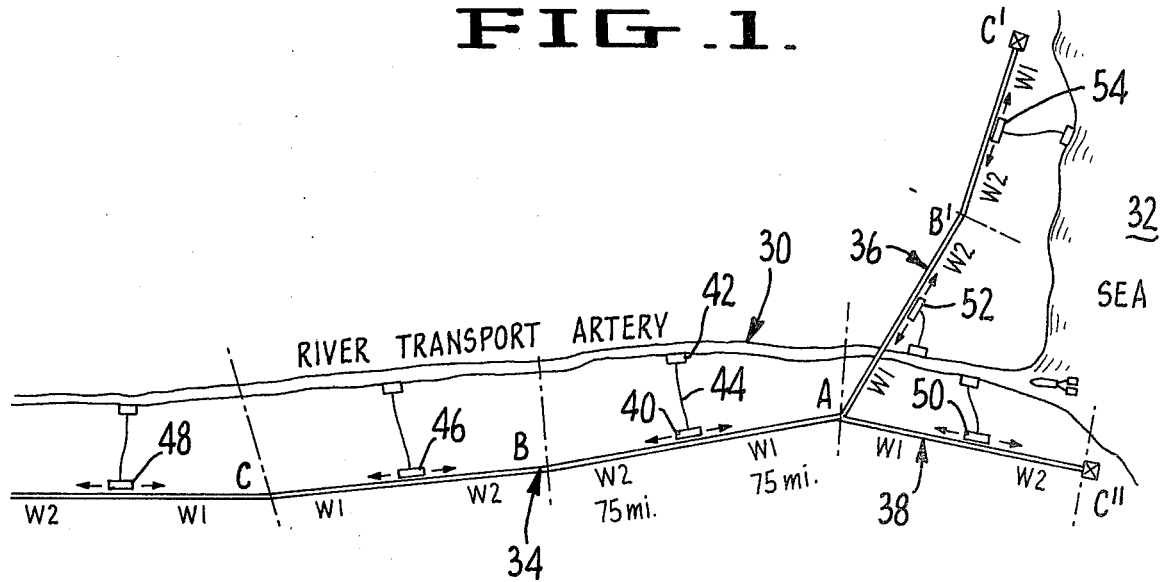
FIG. 2 is an idealized representation of the distribution of the summer fabrication yards of the present invention along a pipeline right-of-way.

Referring now to FIG. 2, there is shown an idealized representation of a portion of an arctic or subarctic pipeline right-of-way in the construction of which the method and apparatus of the present invention are employed. Such a pipeline portion might, for instance, typically be found in the MacKenzie Delta region of Canada.

The region shown in FIG. 2 is traversed by a river or river branch 30, which flows into a northern sea 32, such as the Beaufort Sea.

In accordance with the teachings of the present invention, the main pipeline right-of-way 34 is arbitrarily divided into divisions AB, BC, etc., each of which is between 50 and 100 miles in length. Similarly, the rights-of-way of laterals 36, 38 are divided into divisions AB', B'C', AC'', etc., each of 100 to 150 miles or less in length.

Division AB will now be described, as exemplary only, it being understood that the other divisions of the pipeline and lateral rights-of-way are similar provided with facilities of the kind contemplated by the present invention.

In accordance with the present invention, a summer fabrication yard 40, described in detail hereinafter, is established at the approximate midpoint of division AB. As will be understood by those having ordinary skill in the art, summer fabrication yard 40 and the other facilities provided in accordance with the teachings of the present invention are not shown to scale in FIG. 2.

Summer fabrication yard 40 is connected to a wharf 42 at or near the closest point on river 30 by means of an access road 44, which will in accordance with the teachings of the present invention be a gravel pad of the now well-known type, approximately 4 feet deep and upwards of 50 feet wide. In accordance with now well-known techniques, gravel pad or gravel road 44 may be comprised of naturally occurring gravel borrow, or crushed local rock gravel, or both. As will be described in detail hereinafter, a substantial part of summer fabrication yard 40 will also be a gravel pad of the same type.

In accordance with a principal feature of the present invention, some or all of the summer fabrication yards 40, 46, 48, 50, 52, 54, etc., are located at the intended later sites of compressor stations or pump stations, so that the wharves, access roads, supply airstrips, gravel pads, etc., supplied for the summer fabrication yards of the present invention will not merely be abandoned, with consequent great economic waste, once the pipeline is constructed, but will continue to be used to supply and service the compressor station, pumping station, or the like, later located at the same site. A further savings will be effected, in accordance with the invention, by using part of the gravel from the pads making up yard 40 for annual thaw settlement and erosion along the pipeline.

As will also be seen in FIG. 2, some of the summer fabrication yards, such as summer fabrication yard 54 in division B'C', may be supplied from wharves or lightering facilities located on the seacoast, rather than on river 30. It will also be understood by those having ordinary skill in the art that in certain areas remote from the sea, e.g., near the headwaters of river 30 the summer fabrication yards of the invention will be supplied from freight yards located on railway lines, connected to their associated summer fabrication yards by gravel pad roads similar to gravel pad road 44 of FIG. 2.

In accordance with another feature of the present invention, the facilities provided at the summer fabrication yards of the invention are sufficient to permit the fabrication, coating, and hydrostatic testing of elongated (e.g., up to 2500 foot) pipe sections of sufficient collective length to span one-half of the right-of-way division in which that summer fabrication yard is located. In other words, each summer fabrication yard of the invention provides sufficient facilities to substantially completely fabricate one-half of the pipe necessary to span the pipeline division in which it lies during the part of a summer in which temperatures are sufficiently high for outdoor hydrostatic pipe section testing with water, and for outdoor fabrication of high-quality girth welds, external pipe coating, final inspection, river coating and weighting, instrumenting the pipe sections with sensors for sensing their physical characteristics at certain locations therealong, and the fabrication of short special pipe bends, valves, and fittings.

Thus, as will now be understood by those having ordinary skill in the art, as taught by the present disclosure, upon comparing FIG. 1 and FIG. 2, it is a feature of the present invention that each summer fabrication yard serves for two summers (S1 and S2), and that the pipe sections fabricated, etc., during each of these summers are transported to their places of installation in the pipeline and incorporated into the pipeline during the following winter (W1 and W2). As will be made evident hereinafter, each summer fabrication yard is provided with a marshalling or storage yard for storage of the pipe sections produced in one summer.

Referring now to FIG. 3, there is shown a sectional view in elevation of the W1 subdivision of division AB of the arctic pipeline right-of-way of FIG. 2, taken during winter W1 when the elongated pipe sections fabricated during the previous summer S1 in summer fabrication yard 40 are being installed along subdivision W1. More particularly, FIG. 3 is a sectional view in elevation of the "working section" of subdivision W1, i.e., the short segment of subdivision W1 along which summer-fabricated elongated pipe sections from the marshalling yard are being strung, joining with girth welds, visually inspected in situ, and covered.

As will now be appreciated by those having ordinary skill in the arctic and subarctic pipeline construction art, informed by the present specification and drawings, it is a characteristic feature of the present invention that the winter "working section" in each division of the pipeline can be and is extremely short, e.g., less than 6 miles in length, because so much of the work which would necessarily be performed under harsh winter conditions along the right-of-way in accordance with prior art arctic and subarctic pipeline construction methods is performed in summer at the summer fabrication yard in accordance with the teachings of the present invention.

As will be understood by those having ordinary skill in the arctic and subarctic pipeline construction art, the "working section" of the W1 subdivision shown in FIG. 3 comprises a ditch 60 dug by a conventional ditching machine or by blasting in frozen permafrost 62, it being well-known to those having ordinary skill in the art that such a ditch dug in frozen permafrost in winter not only can be kept open for as extended a period as desired, up to the time of spring thaw, but at the same time is substantially free of "caving" and the other annoyances characteristic of pipeline ditches dug in permafrost regions in summer.

The permafrost 62 is, at the particular geographic location of division AB, overlain with a layer 64 of tundra.

Elongated snow pads 66 and 68 have been laid upon the tundra 62 by snow-making machines of well-known kinds and compacted by bulldozers and the like, also of well-known kinds. It will be understood that the greatly elongated dimensions of snow pads 66 and 68 extend perpendicular to the plane of FIG. 3. Spoil piles 70, 71 of permafrost and tundra lie upon elongated snow pad 66, having been deposited there during the digging of ditch 60.

Typical of the equipment found in use at the working section of subdivision W1, of which FIG. 3 is a transverse cross-section, is sideboom tractor 72, seen as engaged in lifting into ditch 60, along with other sideboom tractors (not shown), a summer-fabricated elongated pipe section 74.

As also seen in FIG. 3, the central portion of elongated snow pad 68 serves as a traffic pad along which truck 78 and other vehicles, such as sideboom tractors, crew transport trucks, etc., move from place to place in the working section.

Located on the portion of elongated snow pad 68 remote from ditch 60 will be survival shacks, such as survival shack 80, supply dumps, and the like.

Typically, the working section of each W1 subdivision will be approximately 120 feet in width.

Referring now to FIG. 4, there is illustrated a further characteristic feature of the present invention whereby great economies are effected by the reusing of the compacted snow from which the elongated snow pads are fabricated.

As pointed out hereinabove, the working section of each W1 subdivision will be very short, e.g., less than 6 miles in length. This working section will move forward along the W1 subdivision (or in winter W2, the W2 subdivision) away from summer fabrication yard 40 as successive summer-fabricated elongated pipe sections are incorporated into the pipeline, inspected, and covered.

Thus, the portion of subdivision W1 between the marshalling yard and the W1 working section will be far wider than is necessary for transporting subsequently incorporated, summer-fabricated elongated pipe sections to the ever-advancing working section.

In accordance with a principal feature of the present invention, large quantities of compacted snow are extracted from the elongated snow pad areas at which the pipeline has already been covered and are carried forward to the front end of the elongated snow pad or pads, i.e., the end most remote from the summer fabrication yard, and there re-incorporated into the elongated snow pad or pads, effecting very substantial savings in snow costs.

The ever-lengthening section of the snow pad or road from the marshalling yard to the point at which the pipeline has just been completed will be called the "transport section" herein.

Referring to FIG. 4, there is shown a sectional view in elevation of the "transport section" of said elongated snow pad, which extends from the marshalling yard to the inner end of the "working section" of said snow pad.

Comparing FIG. 4 with FIG. 3, it will be seen that the elongated snow pad 84 of FIG. 4 is approximately half as wide as the two snow pads 66, 68 of FIG. 3 taken together.

As will be evident to those having ordinary skill in the art, informed by the present disclosure, this difference in width is due to the fact that in accordance with the teachings of the present invention a large amount of snow which formerly overlaid the permafrost 86 and tundra 88 when summer-fabricated elongated pipe sections were being laid has been removed and transported to the outer end of the working section or beyond for reincorporation into said elongated snow pad.

In accordance with another characteristic feature of the present invention, as illustrated in FIG. 4, snow is extracted from the earlier, no longer fully used, section of the working pad, leaving only a transport pad, by means of low ground-pressure scrapers such as scraper 90, and is then transported by scraper 90 to the outer end or head of the elongated snow pad for re-incorporation therein.

As also shown in FIG. 4, and in accordance with a principal feature of the present invention, summer-fabricated elongated pipe sections such as pipe section 100 are towed to their places of installation over the transport section of said elongated snow pad, with several portions of each thus transported elongated pipe section raised a short distance from the transport snow pad by means of a sideboom tractor such as sideboom tractor 102, and portions intermediate the raised portions bearing upon the transport snow pad to prevent destructive "whipping" of the elongated pipe section being transported.

As will now be understood by those having ordinary skill in the art, informed by the present disclosure, a principal aspect of the method of the present invention consists in (a) fabricating at each one of a number of summer fabrication yards a number of elongated pipe sections of sufficient total length to span one-half of an arbitrarily selected pipeline division centered at each such fabrication yard, (b) storing the elongated pipe sections produced at each fabrication yard during one summer in a marshalling yard located at that fabrication yard until the beginning of the following winter, (c) employing said elongated snow pad as a base for laying said summer-fabricated elongated pipe sections along said pipeline right-of-way, (d) extracting snow from portions of said elongated snow pad at which said elongated pipe sections have already been laid and transporting the extracted snow forward to the end of said elongated snow pad remote from each summer fabrication yard by means of low ground-pressure scrapers, for re-incorporation into said snow pad, and (e) towing yet-to-be-laid ones of said summer-fabricated elongated pipe sections over the reduced width transport section of said elongated snow pad to the working section thereof with certain portions of each elongated pipe section raised a short distance from the transport section of the snow pad by sideboom tractors and other portions thereof bearing upon the transport section of the snow pad to damp out otherwise destructive elastic vibrations.

Before describing the method of thus transporting said summer-fabricated elongated pipe sections which is a principal feature of the present invention in greater detail, certain features of the summer-fabricated elongated pipe sections which are themselves a characteristic feature of the present invention and the methods used in fabricating the same at the summer fabrication yards of the present invention will be described in detail.

Referring now to FIG. 5, there is schematically shown the summer fabrication yard 40 which is located near the midpoint of pipeline right-of-way division AB (FIG. 2). It is to be understood that the summer fabrication yards 46, 48, 50, 52, 54, etc., located in other pipeline divisions may vary somewhat in layout, number of buildings, etc., from summer fabrication yard 40, but that all such summer fabrication yards, each comprising a plurality of summer-constructed buildings, a stockpile of pipe joints, and pipe section fabrication, handling, and storage means constitute a principal and characteristic feature of the present invention.

Referring again to FIG. 5, it will be seen that summer fabrication yard 40 comprises a stockpile of pipe joints 106. The pipe joints in stockpile 106 are brought to the mouth of river 30 (FIG. 2) by seagoing vessels, and then transshipped to barges or river craft which carry them to wharf 42 (FIG. 2). The pipe joints landed at wharf 42 are then carried to stockpile 106 over a gravel road 44 (FIG. 2) by truck. Stockpile 106 can accommodate 100 miles of 40 foot joints of 48 inch outside diameter of 0.720 inch wall thickness, disposed on wooden slipways which are arranged to be accessible by way of gravel pad aisles or supply roads.

Pipe joints are taken from stockpile 106 to welding facility 108 (FIG. 5), which itself comprises a summer-constructed, open-ended building or series of buildings 110, and a conveyor or conveyors 112 extending the length of facility 108, both inside and outside of building 110.

Except as hereinafter noted, all of the buildings of summer fabrication yard 40 are summer-constructed, open-ended buildings. Both building 110 and conveyor equipment 112 are located on a gravel pad. (The gravel pads underlying various parts of summer fabrication yard 40 will consume about 1500 cubic yards of gravel or borrow.)

The length of the uncovered section of conveyor equipment 112 is of sufficient extent so that standard length pipe sections (approximately 500 feet in length) can be welded up in welding facility 108 and then moved laterally, e.g., on wooden slipways, to an x-ray and repair facility 114 (FIG. 5), consisting of a summer-constructed, open-ended building and conveyor equipment of the same general type as the building or buildings 110 and conveyor equipment 112 of welding facility 108.

The standard length pipe sections welded up from pipe joints in facility 108 are x-rayed and repaired in x-ray and repair facility 114. Much of the equipment used in the various pipe section producing facilities of summer fabrication yard 40 is portable equipment of well-known types, some of which can be used in the subsequent winter in installing along pipeline right-of-way 34 (FIG. 2) the pipe sections fabricated at summer fabrication yard 40 during the summer.

It is to be noted, however, that the invention contemplates the extensive use in summer fabrication yard 40 of automatic welding machines, which will not be used in installing pipe sections in winter.

After x-ray and repair the standard length pipe sections are coated at coating facility 116, some are weighted at weighting facility 118, and then all sections are moved laterally to hydrostatic testing facility 120 where they are hydrostatically tested, using water piped from river 30 (FIG. 2) as the testing medium, e.g., for 24 hours at 1400 pounds per square inch. Pipe mill test equipment is used in hydrostatic testing facility 120 to permit of rapid test preparation, and this equipment may be duplicated to avoid interruption of the work flow through summer fabrication yard 40. Hydrostatic testing facility 120 comprises a summer building 120 and is based on a wide gravel pad 124. Wooden slipways are provided for movement of the standard length pipe sections to facility 120.

In accordance with one embodiment of the method of the invention, facilities 108, 114, 116, and 118 are only long enough for fabricating 500 foot pipe sections, while hydrostatic testing facility 120, by contrast, is somewhat over 5000 feet in length and so equipped that ten 500 foot sections can there be welded together into a single 5000 foot section for hydrostatic testing. By thus hydrostatically testing 5000 feet of pipe section at one time, a 24 hour hydrostatic testing requirement can be met without impeding the flow of work through summer fabrication yard 40.

Further, in accordance with this same embodiment of the method of the present invention, the tested 5000 foot pipe sections are cut into pre-planned lengths, as predetermined by the engineering department of the pipeline or the pipeline subcontractor from pipeline right-of-way surveys taken earlier.

The pre-planned pipe sections are moved by sideboom tractors to the marshalling yard 126 where they are instrumented, as explained in detail hereinafter.

As further seen in FIG. 5, summer fabrication yard 40 is also provided with facility 134 for fabricating valves and special fittings. This facility is also used for fabricating special short pipe sections with bends of less than the permissible roped radius of curvature of the pipe, only a few of which will be needed in the very level or only lightly rolling terrain which characterizes the arctic and subarctic regions in which the methods and apparatus of the present invention have their principal application.

As also seen in FIG. 5, summer fabrication yard 40 is provided with a warehouse or warehouses 138 to accommodate fittings and supplies, food and other necessities for the personnel of summer fabrication yard 40, etc, and a camp 140 for accommodating the shelter requirements of the personnel employed at summer fabrication yard 40. In accordance with the present invention, camp 140 is, wholly or in part, made up of winterized trailers, or the like, because, as is evident from FIG. 1 and the discussion of the same found hereinabove, the construction workers who fabricate the pre-planned pipe sections stored in marshalling yard 126 during summer weather will remain through the winter, either to transport the pre-planned pipe sections to their places of installation along pipeline right-of-way 34, and install them there, or to prepare the successive pre-planned pipe sections for movement to their places of installation at summer fabrication yard.

Summer fabrication yard 40 is also provided with an air strip 139 and the facilities commonly used in connection with an air strip in arctic and subarctic regions.

Typically, summer fabrication yard 40 may cover an area of about 2100 feet wide and 7500 feet long, including a pumping or compressor station area 141 which the pumping or compressor station later remaining at the summer fabrication yard site will be erected.

Marshalling yard 126 will typically be an ungraveled area crossed by large numbers of wooden slipways of sufficient strength to collectively support all of the pre-planned pipe sections which will be laid in one pipeline subdivision during the winter following their fabrication. Gravel roads are provided around the periphery of marshalling yard 126 over which sideboom tractors can move pipe sections to and from said slipways. Winches and cables are provided for moving the pre-planned pipe sections along said slipways, to and from said outer gravel roads, where they are laid down on or picked up from the ends of said rails or slipways by sideboom tractors.

By way of example only, marshalling yard 126 may at peak accommodate 375 pipe sections, all stored on said slipways in the order of their departure during the following winter for their places of installation in the selected pipeline subdivision. The average length of these pipe sections may be, for example, 1400 feet. During the summer of their fabrication these pipe sections will be instrumented in the marshalling yard.

Marshalling yard 126 is also provided with a gravel-covered winter preparation area adjacent right-of-way 34 at which, in the winter of their installation, the pipe sections may be successively provided with hermetically sealed end closures and pressurized, the sensing instruments fitted inside each pipe section during the winter being first connected to suitable instrument terminals mounted on the end closures. (Reference is made here to sensors or sensing instruments being mounted on the inside of the pre-planned pipe sections as in FIG. 7 because the type of pipe contemplated in the examples given herein is 48 inch pipe. When the methods and apparatus of the present invention are applied to pipeline construction from smaller diameter pipe, however, these sensors or sensing instruments may in some cases be mounted on the outer face of the pipe.)

When it is determined by the pipeline engineering department that the pipe must be provided with crack arrestors, i.e., short, split sleeves welded onto the pipe at predetermined intervals, the winter pipe section preparation facilities at the fabrication yards will also serve to deposit a fillet of ski wax or the like completely around each end of each crack arrestor to reduce the drag when the pipe section is towed over an elongated snow pad to its place of installation in accordance with the principles of the present invention. The winter preparation facilities at each summer fabrication yard may also be provided with spray equipment for spraying ski wax or a like lubricant onto the lower surface of each pipe section for lubricating its passage over an elongated snow pad when being towed to its point of installation.

Referring now to FIG. 6, there is shown a pipe section closure 142 embodying a principal feature of the present invention welded to one end of a multi-joint pipe section 144 of the kind which itself constitutes a principal feature of the present invention (shown in part only).

Pipe section closure 142 comprises a short segment 146 of the same type of pipe used in constructing the pipeline itself. (In the principal embodiment of the present invention described herein in connection with FIG. 2, for instance, pipe segment 146 would be cut from 48 inch diameter pipe having a wall thickness of 0.720 inches.)

The end of segment 146 remote from pipe section 144 is closed by means of a cap 148 having an outer rim 150 which is welded to one end of segment 146 by means of a continuous weld bead which hermetically seals cap 148 to pipe segment 146.

Cap 148 is domed and is provided with strengthening ribs 152, 154, etc., in order to be able to resist internal pressures of 100 to 150 pounds per square inch when a pipe section closure 142 is welded to each end of pipe section 144 and the pressure within pipe section 144 is raised to 100 pounds per square inch.

Cap 148 is also provided with an eye 156 for attaching pipe section 144 to a tow tractor in carrying out the method of the present invention.

An air pressure gauge 158 is mounted on segment 146 for measuring the pressure of the gaseous medium within segment 146 and indicating that pressure to pipe moving crew members and others when pipe section 144 is being moved from the marshalling yard where it was stored in summer to its place of installation.

In accordance with a principal feature of the present invention, pipe segment 142 is welded to pipe section 144 by means of a continuous weld bead 160, and thus the pressure indicated by pressure gauge 158 is the internal pressure inside pipe section 144. An air hose coupling 162 is hermetically sealed in a closefitting opening in pipe segment 146. Air under pressure is supplied to the interior of pipe section 144 by means of an air hose connected at one end to air hose coupling 162 and at the other end to a suitale air compressor mounted on a nose sled of the present invention (see FIG. 9).

An electrical connector 164 is also mounted on pipe segment 146, and provides hermetically sealed electrical connections with the interior thereof, for reasons which will be more fully explained in connection with FIG. 7 below.

It is to be noted that while pipe section closure 142 of FIG. 6 is equipped with an air pressure gauge 158, an air hose coupling 162, and an electrical connector 164, other pipe section closures embodying the present invention may be provided with different interconnection equipment and gauging equipment, or none.

Thus, for example, the closure which is welded to the rearward end of pipe section 144 (remote from the two tractor) may be provided with only a preset pressure release valve set to 100 pounds per square inch, hermetically sealed in a close fitting opening in pipe segment 146.

Referring now to FIG. 7 there is shown a transverse view in section of pipe section 144, fitted with strain gauges and a temperature sensor in accordance with the teachings of the present invention.

A temperature sensor of the well-known type, such as a thermocouple, thermistor, or Thermoswitch, is mounted in a suitable block 168 of heat conducting material which is itself affixed to the inner face of pipe section 144 by means of a suitable high-thermal-conductivity bond. This temperature sensor is provided with suitable leads 170, 172 which are themselves connected to two separate, mutually-insulated pins or conductors of connector 164 (FIG. 6).

A plurality of strain gauges 174, 176, 178, 180 are bonded to the inner surface of pipe section 144 in the well-known manner, all lying in a common plane perpendicular to the axis of pipe section 144 and distributed about the axis of pipe section 144 (perpendicular to the plane of FIG. 7) as indicated in FIG. 7, with their strain sensing axes all parallel to the axis of pipe section 144.

The leads of strain gauge 174 are cabled as a cable 182, the leads of strain gauge 178 are cabled as a cable 184, etc. The cabled leads of strain gauges 174, 176, 178, and 180 are affixed to the inner surface of the pipe wall by means of suitable adhesive patches 186, 192. Further lengths of the cabled leads of these strain gauges are carried along the wall of pipe section 144, longitudinally thereof, by suitable additional adhesive patches, and thus through pipe segment 146 to hermetic sealing electrical connector 164, the individual leads of the strain gauges 174, 176, 178, 180, etc., being individually electrically connected to separate, mutually insulated pins or conductors of electrical connector 164. (As will be evident to those having ordinary skill in the art, however, the 90-degree-spaced strain gauges 174, 176, 178, 180 can be interconnected in well-known bridge fashion inside pipe section 144 or closure 142, and interconnected with suitable pairs of balancing resistances and a supply battery or batteries, whereby the necessary number of independent conductors or pins passing in hermetically sealed fashion through electrical connector 164 is very considerably reduced. As is also well known to those having ordinary skill in the art, said 90-degree-disposed strain gauges 174, 176, 178, 180, when interconnected in a suitable bridge circuit arrangement, will indicate the amount of bending of pipe section 144 at the cross section thereof in which these strain gauges lie.)

In carrying out the method of the invention, the strain gauges and temperature sensing element or elements located within pipe section 144 are interconnected by means of a cable suitably joined to electrical connector 164 to suitable transducer circuits located, e.g., in an enlarged cab mounted on the aforesaid tow tractor, which transducer circuits operate indicating instruments to indicate to the crew chief of the pipe moving crew, riding in said enlarged cab, the temperature of the pipe wall and the amount of bending sustained by the pipe section 144 as it is moved over said elongated snow pad to its place of installation. When one set of four strain gauges, such as strain gauges 174, 176, 178, 180, are employed, this set of strain gauges will preferably be located about 20 to 40 feet from the forward end of the nearest joint of pipe to the tow tractor. Additionally sets of strain gauges may be employed, within the scope of the invention, to indicate the amount of bending at other cross sections of pipe section 144 as found suitable. Similarly, additional temperature sensors may be located at other parts of the pipe section 144 as found suitable.

Going now to FIG. 8, there is shown (in phantom) a portion of pipe section 144 to which there is attached a pipe-supporting sled, which sled constitutes a feature of the present invention. Sled 200 comprises runners 202, 204 and a two part yoke 206 capable of embracing and grasping pipe section 144. Yoke 206 comprises hinge means 208 and fastening means 210 whereby sled 200 may be readily secured to pipe section 144 or removed therefrom with the assistance of a sideboom tractor.

Further, yoke 206 is provided with a large eye 212 capable of engaging the hook of a sideboom tractor, whereby the sideboom tractor can lift sled 200 from said elongated snow pad, or serve to assist said tow tractor when pulling pipe section 144 uphill, or prevent downhill "runaway" of pipe section 144.

Referring now to FIG. 9, there is shown the forward end of pipe section 144 as it appears while being moved over elongated snow pad 214 from the marshalling yard to its place of installation. As will now be understood by those having ordinary skill in the art, informed by the present disclosure, the sections of elongated snow pad 62 (FIG. 3), 84 (FIG. 4) and 214 (FIG. 9) are all parts of one continuous elongated snow pad in the preferred mode of carrying out the method of the invention. As pointed out hereinabove, the forwardmost portion of pipe section 144 is carried on a nose sled 216 in accordance with a feature of the present invention.

As also seen in FIG. 9, closure 142 is carried on nose sled 216 and eye 156 of closure 142 is linked to a drawbar 218 which is itself linked to the tow eye of the tow tractor.

The tow tractor employed in that embodiment of FIG. 9 is actually made up of two tow tractors 220, 222 connected in the well-known tandem fashion with their controls interconnected servoelectrically, whereby a single tow tractor operator 224 is able to control both tow tractors. The forward tow tractor 222 is provided with an enlarged cab 226 capable of accommodating not only tow tractor operator 224 but also the chief or controller 228 of the pipe section moving crew which is moving pipe section 144 from the marshalling yard to its place of installation. Preferably, the crew chief or controller 228 is seated looking rearwardly of tow tractor 222 in an elevated position and thus is able to view, by means of floodlights such as floodlight 230, a substantial portion of pipe section 144 as it is towed over elongated snow pad 214 under his direction. Further, an instrument connection cable 232 runs from electrical connector 164 (FIG. 6), along nose sled 216, and along rear tow tractor 220, to a console 234 located in cab 226 in such a position as to be easily viewable by the crew chief or crew controller 228.

Console 234 contains transducer circuits for operating indicators located in front of crew chief or controller 228 in accordance with signals received from the strain gauges and temperature sensors located inside pipe section 144 (see FIG. 7). The electrical power for operating these indicating and transducing instruments and for operating floodlights such as floodlight 230 are derived from the generator of tow tractor 222 or from an auxiliary generator mounted on tow tractor 222.

Also powered from said tow tractor electrical generator or an auxiliary electrical generator mounted on said tow tractor, via electric power cables (not shown), are an air heater 238 and an air compressor 240, both mounted on nose sled 216. Air compressor 240 and air heater 238 cooperate to supply warmed compressed air to the inside of pipe section 144 by means of a suitable heavy duty air hose extending from air heater 238 to air hose coupling 162 (FIG. 6). In the arrangement of FIG. 9 the rear closure of pipe section 144 is preferably provided with a preset air pressure valve set to the desired air pressure within pipe section 144. The air pressure produced by compressor 240 is then set slightly higher than the limit set by said preset pressure valve, whereby it is assured that the air pressure throughout pipe section 144 is maintained at the desired level for rigidizing pipe section 144 in the well-known manner. By thus pressure rigidizing pipe section 144 in the well-known manner it is possible to avoid fortuitous bending effects occasioned by dips in said elongated snow pad, and thus to avoid certain unnecessary bending strains in pipe section 144.

Referring now to FIG. 10, there are shown two intermediate portions of pipe section 144 during its transit from the marshalling yard to its place of installation.

In accordance with a principal feature of the present invention certain intermediate portions of pipe section 144 such as portion 244 and portion 246 are lifted from snow pad 248 by sideboom tractors such as sideboom tractors 250 and 252 while pipe section 144 is being moved forward over said elongated snow pad. Snow pad 248 and the aforesaid snow pads 214, 84 and 62 are in accordance with the preferred mode of carrying out the present invention all parts of a single, continuous snow pad extending from the marshalling yard and growing along the pipeline right-of-way 34 as the pipeline extends outward from the summer fabrication yard 40 (FIG. 2).

As will now be realized by those having ordinary skill in the arctic and subarctic pipeline construction art, informed by the present disclosure, the lifting of intermediate portions of pipe section 144 by sideboom tractors, such as sideboom tractors 250 and 252, serves not only to reduce the drag exerted by pipe section 144 on the draw bar of tandem tow tractors 220, 222 but also serves to prevent the torqueing of pipe section 144 about its longitudinal axis by giving it a "vertical dimension". As will also be realized by those having ordinary skill in this art, informed by the present disclosure, it is equally important that intermediate portions of pipeline 144 between the free spans raised by the sideboom tractors remain in contact with the snow pad in order to avoid the characteristic and often destructive undamped elastic vibrations which were experienced in the prior art when even relatively short pipe sections were carried completely suspended, at very low "crawl" speeds and over very short distances by pluralities of sideboom tractors.

It is contemplated, for instance, that each sideboom tractor spaced along pipe section 144 will raise no more free span than, say, 150 feet, and that when moving pipe section 144 over flat terrain the sidebooms will be spaced by, say, 400 feet, whereby the intermediate portions bearing upon the elongated snow pad will be approximately 250 feet in length.

It is also contemplated that in moving pipe section 144 over undulating terrain more sideboom tractors will be employed, spaced apart by, say, 300 feet; and that where pipe section 144 is being transported up or down a steep slope yet more sideboom tractors may be employed, spaced apart by as little as 200 feet.

As also seen in FIG. 10, the load line of each sideboom tractor is directly attached to a roller cradle 256, 258 of about 20 feet in length through which pipe section 144 passes.

Referring now to FIG. 11, there is shown an elevational view of the roller cradle 256 of FIG. 10, which itself constitutes a feature of the present invention. Preferably, the roller cradle 258 shown in FIG. 10 will be substantially similar to the roller cradle of FIG. 11, or will incorporate the principal novel features thereof, as will all of the roller cradles by which other sideboom tractors elevate other parts of pipe section 144 from said elongated snow pad.

As best seen in FIG. 11, roller cradle 256 completely surrounds a portion of pipe section 144. The portion of pipe section 144 surrounded by roller cradle 256 will preferably be about 20 feet in length, as will roller cradle 256.

As also seen in FIG. 11, a particular, short portion of pipe section 144 is contacted by four pneumatic tires 260, 262, 264, 266. However, the roller cradle 256 incorporates not one set of pneumatic tires 260, 262, 264, 266 but also incorporates four more sets of pneumatic tires each identified by a suffix A, B, C, or D. The five sets of tires are spaced along the portion of pipe section 144 surrounded by roller cradle 256. The tires of each set are correspondingly positioned about the axis of pipe section 144. Thus, all of the upper tires 260, 260A, 260B, 260C, 260D will be positioned above pipe section 144 and contact the top surface thereof. Similarly, all of the lower tires 266, 266A, 266B, 266C, 266D will be located below pipe section 144, and in weight-bearing contact therewith. Similarly, all of the left tires (as seen in FIG. 11) 262, 262A, 262B, 262C, 262D will be similarly positioned with respect to the length of pipe section 114 within roller cradle 256, the axles of all of these tires lying substantially in the same plane parallel to the axis of said length of pipe section 144, and all of these tires contacting pipe section 144 as tire 262 is seen to contact pipe section 144 in FIG. 11. Tires 264, 264A, 264B, 264C, 264D also have axes which lie in a common plane parallel to the axis of the length of pipe section 144 lying within roller cradle 256, and all contact pipe section 144 as tire 264 is seen to contact pipe section 144 in FIG. 11.

It is to be noted, however, that the lower tires 266, etc., may not all be of the same outside diameter. Rather, due to the fact that the principal burden of supporting, say, a 150 foot span of pipe section 144 is borne by lower tires 266, 266A, 266B, 266C, 266D, these lower tires may be of varying size, the tires of largest diameter being the 266 and 266D tires and the tire of least diameter being the 266B tire. The axles of the wheels on which these tires are mounted are vertically spaced from the lower face of the length of pipe section 144 passing through roller cradle 256 by different distances, each distance being substantially equal to the maximum radius of the tire.

It is to be understood that each of these roller cradles is particularly designed for use in constructing a pipeline from pipe of a particular diameter. Further, it is to be understood that in constructing a particular pipeline involving water crossings, and thereby involving the necessity for transporting concrete-coated, river-weighted pipe, two different classes of the roller cradle of the invention will be provided, one class designed to closely fit epoxy-coated pipe, and the other class designed to closely fit concrete-coated pipe.

As may best be seen by comparison of FIGS. 10 and 11 the frame of roller cradle 256 comprises transverse frame members of the kind shown in FIG. 11, wherein the axles of the pneumatic-tired wheels 260, 262, 264, 266 are journaled in high quality bearings for free rotation.

As seen in FIG. 11, the two principal transverse frame members supporting pneumatic-tired wheels 260, 262, 264, 266 are the generally A-shaped upper transverse frame 270 and the three-lobed lower transverse frame 272; together constituting the transverse frame 274. Upper rubber-tired wheel 260 in FIG. 11 is journaled in bearings mounted in upper transverse frame 270, and the remaining rubber-tired wheels 262, 264, 266 are journaled in bearings mounted in lower transverse frame 272.

In addition to transverse frame 274, rotatably supporting pneumatic-tired wheels 260, 262, 264, 266, roller cradle 256 also comprises four other substantially similar transverse frames 274A, 274B, 274C, 274D, each of which rotatably supports the corresponding group of pneumatic-tired wheels the reference numerals applied to which have the same alphabetic suffix. Thus, for instance, upper wheel 260A is rotatably mounted in transverse frame 274A, lower wheel 266D is rotatably mounted in transverse frame 274D, etc.

As may best be seen by comparing FIGS. 10 and 11, the just-described transverse frames are all joined together by longitudinal frame members 275A through 275E and 280 which are affixed to the traverse frames, e.g., by welding. Thus, all of the upper transverse frame members 270 through 270D are joined together by longitudinal frame members 275A, 275B, and 280 to form an upper "cage", and all of the lower transverse frame members 272 through 272D are joined together by longitudinal frame members 275C, 275D, and 275E to form a lower "cage".

As best seen in FIG. 11, upper transverse frame member 270 is hinged to lower transverse frame member 272 by means of a suitable hinge pin 276. Similarly, all of the upper transverse frame members 270 through 270D are hinged to the corresponding lower transverse frame members 272 through 272D by means of hinge pins 276 through 276D, all of which are colinear.

Further, a quick-acting latch member 278 is provided (FIG. 11) whereby upper transverse frame member 270 can quickly be latched to and unlatched from lower transverse frame member 272. Similar quick-acting latches 278A through 278D are provided for each corresponding transverse frame 274A through 274D. These quick-acting latches 278 through 278D may be joined together for simultaneous operation by a single common latch operating bar.

Thus, it may be seen that the entire frame of roller cradle 256 is divided into an upper cage and a lower cage, and that by means of the simultaneously operated quick-acting latches 278 through 278D the upper cage may be unlatched and pivoted with respect to the lower cage, around the axis of the pivot pins 276 through 276D. By this means roller cradle 256 may be pivoted open about the axis of hinge pins 276 through 276D, making the insertion of pipeline 144 into roller cradle 256, or the removal of pipe section 144 from roller cradle 256, easy and rapid.

It is within the scope of the present invention to provide auxiliary legs on each lower transverse frame 272 through 272D whereby the lower cage portion of roller cradle 256 can stand upright on level ground to receive a length of pipe section 144 lowered into it by a sideboom tractor. It is also within the scope of the present invention to replace hinge pins 276 through 276D with a coordinated set of latches similar to latches 278 through 278D, whereby the upper cage may be removed from the lower cage to further facilitate the positioning of a length of pipe section 144 in the lower cage of roller cradle 256; whereafter the upper cage will be refastened to the lower cage by means of the two sets of quick-acting latches.

As further seen in FIG. 11, the upper longitudinal frame member 280, which joins the upper ends of the upper frame members 270, 270D is provided with an eye 282 adapted to receive the hook of the load line of a sideboom tractor for the purpose of raising roller carriage 256 and a free span of pipe section 144 from the surface of said elongated snow pad, as shown in FIG. 10.

As also seen in FIG. 11, roller cradle 256 is provided with an eye 284 for the connection of handlines to be used in positioning roller cradle 256 to receive a length of pipe section 144.

In accordance with another principal feature of the present invention, each pneumatic-tired wheel 260 through 266D is provided with a suitable hydraulic brake, similar to the hydraulic brakes used in passenger automobiles, industrial trucks, etc. Further, a hydraulic hose 286 of well-known type extends from roller cradle 256 to the sideboom tractor which supports roller cradle 256, whereby the sideboom operator can, by remote control, "lock" each pneumatic-tired wheel 260 through 266D to its associated axle. Thus, since each set of four pneumatic-tired wheels is so located in its associated transverse frame as to jointly with the other wheels grip pipe section 144 when all four wheels are braked, it follows that the sideboom operator can by manipulation of hydraulic controls in his cab brake all twenty pneumatic-tired wheels of roller cradle 256 and thus prevent pipe section 144 from slipping through roller cradle 256.

By this means, in carrying out the method of the present invention, the sideboom tractors which support portions of pipe section 144, such as sideboom tractors 250 and 252 in FIG. 10, may be used to either exert tractive force on pipe 244 via roller cradle 256, thereby helping to pull it forward over said elongated snow pad, or may be used to brake pipe section 144 when it is being transported downhill and tends to "run away".

In accordance with another feature of the present invention, stationary sideboom tractors distributed along a portion of pipe section 144, with their roller cradle brakes unoperated, are used in moving pipe section 144 over relatively rough terrain.

In carrying out this aspect of the invention, the forwardmost portion of pipe section 144 is drawn by tandem-coupled tow tractors through a series of roller cradles attached to the load lines of a series of stationary sideboom tractors. No braking forces are applied to any of the pneumatic-tired wheels which contact, support and guide pipe section 144, and thus pipe section 144 will pass freely through all of the roller cradles supported on the load lines of said stationary sideboom tractors. The adjacent sideboom tractors are spaced apart by no more than the maximum permissible free span of the particular pipe employed in the pipeline under construction, which may, for example, be about 150 feet.

It will also be understood by those having ordinary skill in the art, informed by the present disclosure, that where lifting eye sleds such as sled 200 of FIG. 8 are employed in thus moving pipe section 144 over relatively rough terrain, these lifting eye sleds must be uncoupled from pipe section 144 before reaching the rearmost roller cradle (farthest from the tandem tow tractors).

The positioning of the stationary sideboom tractors will, of course, be in the control of the crew chief or controller in the enlarged cab of lead tow tractor 222 (FIG. 9). Alternatively, a number of sideboom tractors with suitable roller cradles may be stationed at extended rough terrain segments of said elongated snow pad to act as "helpers" in aid of the sideboom tractors which accompany pipe section 144 all the way from the marshalling yard to its place of installation.

Such stationary sideboom tractors may also be used when a multi-joint pipe section is being moved around a relatively sharp bend in the pipeline right-of-way.

Consider the case in which the path followed by pipe section 144 does not anywhere have a radius of curvature less than the permissible roped radius of curvature of the pipe of pipe section 144. If there were a slight downslope in the terrain transverse of said path, and if further sideboom tractors, e.g., 256, 258, were locked to pipe section 144, and "pushed" pipe 144 excessively, then in the absence of such stationary sideboom tractors pipe section 144 could locally assume a bend of less radius than the permissible roped radius of curvature of the pipe, causing buckling of pipe section 144, or resulting in pipe section 144 or a considerable span thereof being marked by a pipeline inspector and thus excluded from use in the pipeline being constructed.

In accordance with this particular method of the invention, however, stationary sideboom tractors are positioned around the curved section, pipe section 144 passing through roller cradles suspended from the load lines of each of these stationary sideboom tractors, and the wheels of roller cradle are unbraked. Thus, in accordance with this present novel method, pipe section 144 is towed through the roller cradles of these stationary sideboom tractors, and buckling of pipe section 144 is avoided.

As will be evident to those having ordinary skill in the art, informed by the present disclosure, this method of the present invention need not be used over all stretches of rough terrain encountered on arctic and subarctic pipeline rights-of-way. For example, when "dips" in the terrain are not particularly large it may be preferable, as determined by the pipeline engineering department, to fill these dips with either natural or artificial snow, thereby rendering the surface of the elongated snow pads smooth throughout such stretches of minor terrain roughness.

Further, the filling of such "dips" need not be as wide as the entire working snow pad, or even the transport snow pad, but need be only sufficiently wide to accommodate the pipe itself, the pipe being "lead" through such a stretch by a sideboom tractor at its forward end, the sideboom tractors themselves operating over the relatively rough "unfilled" terrain.

Ravines or creeks may, at the direction of the pipeline engineering department, be bridged with cable-supported suspension bridges, which may be floored with rollers for aiding the advance of the pipe section and may be only sufficiently wide to accommodate the pipe, the pipe again being "lead" across this bridge by a sideboom tractor equipped with a suitable cradle for grasping the pipe section.

In the arctic and subarctic regions in which the present invention has its principal application it will also often be possible to avoid isolated hills or knobs by laying the elongated snow pad in a "shoe fly" path around the knob or hill.

In other locations at which the pipeline right-of-way necessarily involves unavoidable sharp sidebends it may be possible to lay said elongated snow pad along a straighter path, so that the passage of the towed pipe section can follow a less stringent curvature.

As pointed out hereinabove, the relatively level or lightly rolling arctic and subarctic terrain in which the present invention has its principal application minimizes the required number of pipe bends per mile in excess of the permissible roped radius of curvature of the pipe, and the few short bends required will be supplied by special short pipe sections fabricated during summer at the summer fabrication yard. Further, due to the fact that the pipe is installed during winter in accordance with the teachings of the present invention, and ditches can be dug relatively deep without caving and kept open much longer in winter, it will be possible to eliminate a considerable number of vertical or sag bends in carrying out the method of the present invention by digging the ditch considerably deeper through small ridges or hills.

There will in general, however, remain a minimal number of long bends which must be fabricated by cold bending pipe sections near their places of installation along the pipeline right-of-way.

These cold bends will in general be made by means of a modified bending machine incorporating split bending shoes which may be moved apart in order to be positioned around the pipe section from the side, rather than requiring that the pipe section be advanced through the shoe, as in conventional pipe bending machines.

The mandrels used in connection with these split bending shoes will be adapted to travel by insertion into the open end of the pipe section to the location of each desired bend. These mandrels will be positioned inside the pipe section being bent, in juxtaposition to the split shoes, by acoustic or magnetic means.

In constructing pipelines of 48 inch diameter pipe or larger, field engineers at the summer fabrication yards will mark the bend locations on both the inside and outside of the pipe sections to be bent, whereby in winter a compressed-air driven mandrel may be properly positioned by a human operator riding on a dolly accompanying the mandrel, or by suitable photoelectric servo means.

Further, where found desirable by the pipeline engineering department, pipe section lengths will be determined in such a way that every long, field-made bend will be made at the forward end of the pipe section, i.e., the end nearest the tow tractor.

When such long bends are required in concrete-coated pipe the fabrication workers at facilities 130 and 132 (FIG. 5) will leave such pipe bare at the bend locations. After bending at the place of installation of that pipe section Gunite concrete or bolted on curved weights will be affixed to the bent area of the pipe section if judged necessary by the pipeline engineering department.

When, for any reason, it is not possible to determine the lengths of pipe sections in such a way that all long side bends are made at the forward ends of pipe sections, the necessary bends may be fabricated by first emplacing the pipe section along a section of said elongated snow pad which lies inside the "elbow" of the required bend and itself has no curve less than the roped radius of curvature of the pipe. After thus locating the pipe to be bent near its center span, the bend will be made by means of low ground pressure vehicles equipped with lifting booms and able to cross the tundra area between the sharply bent portion of the pipeline right-of-way and the said snow road section inside its elbow while forcing the pipe section into conformity with the bent section of the pipeline right-of-way. In performing this type of pipe bending operation, it may be required by the pipeline engineering department that the extreme ends of the pipe section be held stationary by means of roller cradles supported on the load lines of stationary sideboom tractors.

In accordance with a particular feature of the present invention, which takes advantage of the fact that only a relatively few girth welds are made in the field in winter, and that the girth welds in each pipe section have been inspected in summer under high hydrostatic pressure when "pinholes" in any girth weld can be found by visual inspection, a "bell hole" is left at each winter-made girth weld when the dich is being otherwise filled, and each "bell hole" is provided with a protective covering. Given these open "bell holes", extended sections of the newly installed pipeline can be tested by pressuring with compressed air at, e.g., 1600 pounds per square inch. As will be understood by those having ordinary skill in the art, pinholes in any of the winter field-made girth welds will then be made evident by the sound of escaping air in one or more of the open "bell holes", or by the odor of an "odorizer" gas added to the compressed air escaping at one or more of the open "bell holes". After such pinholes have been repaired by highly skilled pipeline welders working in the yet open "bell holes" the integrity of the pipeline section can again be tested by raising the air pressure therewithin to about 1600 pounds per square inch, and after no further aural or olefactory "signals" are produced at any open bell hole, the bell holes can be filled.

It will thus be seen that the objects set forth above, among those made apparent from the preceding description, are efficiently attained, and since certain changes may be made in the above methods and constructions without departing from the scope of the invention it is intended that all matter contained in the above description or shown in the accompanying drawings will be interpreted as illustrative only, and not in a limiting sense.

It is particularly noted that although the method of the invention has been disclosed as preventing destructive whipping during the transport of elongated pipe sections over elongated snow pads in arctic and subarctic regions, the same desirable result may be attained in certain other terrains by the employment of wheeled or tracked "damper" vehicles or the like. Furthermore, while the invention has been shown and described as employing strain gauge bend detectors it is to be understood that contact type or photoelectric bend detectors may be employed instead, within the scope of the invention.

It is also to be understood that the following claims are intended to cover all of the generic and specific features of the invention herein described, and all statements of the scope of the invention which, as a matter of language, might be said to fall therebetween.

I claim:

1. The method of pipeline construction in arctic and subarctic regions, comprising:
   welding joints of pipe together to provide a plurality of unitary pipe sections;
   consecutively moving each said pipe section a substantial part of the distance from its place of fabrication to its place of installation over an elongated snow pad with plural parts of said pipe section bearing upon said elongated snow pad; and
   attaching, as by welding, each said pipe section to an adjacent of said sections to form said pipeline.

2. The method of pipeline construction in arctic and subarctic regions as claimed in claim 1 further comprising the step of hydrostatically testing said pipe section at its place of fabrication.

3. The method of pipeline construction in arctic and subarctic regions as claimed in claim 2 further comprising the step of coating said pipe section at its place of fabrication.

4. The method of pipeline construction in arctic and subarctic regions as claimed in claim 1 further comprising the step of substantially completely preparing said pipe section for installation at its place of fabrication.

5. The method of pipeline construction in arctic and subarctic regions as claimed in claim 1, further comprising:
   hermetically sealing caps to the ends of said pipe section;
   injecting a gaseous medium into the capped pipe section and thereby raising the pressure within the capped pipe section to a super-ambient level; and
   maintaining said gaseous medium within said pipe section substantially at said super-ambient pressure while said pipe section is being moved a substantial part of the distance from its place of fabrication to its place of installation.

6. The method of pipeline construction in arctic and subarctic regions as claimed in claim 3, further comprising:
   mounting on said pipe section sensing means for sensing the condition thereof while said pipe section is being moved from its place of fabrication to its place of installation;
   interconnecting said sensing means with indicating means for indicating the condition of said pipe section, said indicating means being mounted on movable means other than said pipe section.

7. The method of pipeline construction in arctic and subarctic regions as claimed in claim 6 in which said indicating means indicate the momentary degree of bending of at least one particular portion of said pipe section.

8. The method of pipeline construction in arctic and subarctic regions as claimed in claim 4 further comprising the step of mounting on said pipe section sensing means for sensing the condition thereof while said pipe section is being moved from its place of fabrication to its place of installation.

9. The method of pipeline construction in arctic and subarctic regions as claimed in claim 8 further comprising the step of interconnecting said sensing means with indicating means for indicating the condition of said pipe section, said indicating means being mounted on movable means other than said pipe section.

10. The method of pipeline construction in arctic and subarctic regions as claimed in claim 9 in which said indicating means indicate the momentary degree of bending of at least one particular portion of said pipe section.

11. The method of pipeline construction in arctic and subarctic regions as claimed in claim 5 further comprising the step of mounting on said pipe section sensing means for sensing the condition of said pipe section while said pipe section is being moved from its place of fabrication to its place of installation.

12. The method of pipeline construction in arctic and subarctic regions as claimed in claim 5 further comprising the steps of supplying heat to said gaseous medium within said pipe section while said pipe section is being moved a substantial part of the distance from its place of fabrication to its place of installation, and controlling the amount of heat supplied to said gaseous medium to maintain the temperature of said pipe section between predetermined limits.

13. The method of pipeline construction in arctic and subarctic regions as claimed in claim 11 further comprising the steps of supplying heat to said gaseous medium within said pipe section while said pipe section is being moved a substantial part of the distance from its place of fabrication to its place of installation, and controlling the amount of heat supplied to said gaseous medium to maintain the temperature of said pipe section between predetermined limits.

14. The method of pipeline construction in arctic and subarctic regions comprising:
   welding joints of pipe together to provide unitary pipe sections when the outdoor temperature is high enough to permit outdoor hydrostatic testing of said pipe sections using water as the testing medium;
   providing an elongated snow pad along at least a part of the pipeline right-of-way;
   moving each of said pipe sections towards its place of incorporation into said pipeline by towing it along said elongated snow pad; and
   attaching, as by welding, said pipe sections in end-to-end relation to form said pipeline.

15. The method of pipeline construction in arctic and subarctic regions as claimed in claim 14 in which at least some of said pipe sections are partially raised from said elongated snow pad while being towed along at least part of said elongated snow pad.

16. The method of pipeline construction in arctic and subarctic regions as claimed in claim 15 further comprising the step of substantially completely preparing said pipe sections for installation at their place of fabrication.

17. The method of pipeline construction in arctic and subarctic regions as claimed in claim 16, further comprising:

hermetically sealing caps to the ends of at least some of said pipe sections;

injecting a gaseous medium into at least some of said capped pipe sections, thereby raising the pressure within those capped pipe sections to a super-ambient level; and maintaining said gaseous medium within said at least some of said capped pipe sections substantially at said super-ambient pressure while each such pipe section is being moved a substantial part of the distance from its place of fabrication to its place of installation.

18. The method of pipeline construction in arctic and subarctic regions as claimed in claim 17 further comprising the steps of mounting on each of said pipe sections sensing means for sensing the condition thereof while each of said pipe sections is being moved from its place of fabrication to its place of installation, and interconnecting sensing means mounted in one of said pipe sections with indicating means for indicating the momentary degree of bending of at least one particular portion of said one of said pipe sections.

19. The method of pipeline construction in arctic and subarctic regions as claimed in claim 1, further comprising:

excavating snow from a portion of said elongated snow pad adjacent which pipe sections have been installed;

transporting said excavated snow to the end of said elongated snow pad remote from said place of fabrication; and incorporating said excavated snow into an extension of said elongated snow pad.

20. The method of pipeline construction in arctic and subarctic regions as claimed in claim 19 in which said excavated snow is excavated and transported by means of low ground-pressure vehicles which are permitted to operate on unprotected frozen tundra and are equipped with excavating means.

21. The method of pipeline construction in arctic and subarctic regions as claimed in claim 10, further comprising:

excavating snow from a portion of said elongated snow pad adjacent which pipe sections have been installed;

transporting said excavated snow to the end of said elongated snow pad remote from said place of fabrication; and incorporating said excavated snow into an extension of said elongated snow pad.

22. The method of pipeline construction in arctic and subarctic regions as claimed in claim 21 in which said excavated snow is excavated and transported by means of low ground-pressure vehicles which are permitted to operate on unprotected frozen tundra and are equipped with excavating means.

* * * * *